United States Patent
Baillet et al.

(10) Patent No.: US 11,525,757 B2
(45) Date of Patent: Dec. 13, 2022

(54) SYSTEM AND METHOD FOR SELECTION OF PHOTOCHROMIC OPTICAL ARTICLES

(71) Applicant: Transitions Optical, Ltd., Tuam (IE)

(72) Inventors: Gilles Baillet, St. Petersburg, FL (US); Christopher J. Baldy, Murrysville, PA (US); Bérangère Granger, St. Petersburg, FL (US); Robert E. Summers, Brandon, FL (US); Cheng Y. Tang, Mars, PA (US)

(73) Assignee: Transitions Optical, Ltd., Tuam (IE)

( * ) Notice: Subject to any disclaimer, the term of this patent is extended or adjusted under 35 U.S.C. 154(b) by 834 days.

(21) Appl. No.: 16/462,365

(22) PCT Filed: Dec. 30, 2016

(86) PCT No.: PCT/EP2016/082928
§ 371 (c)(1),
(2) Date: May 20, 2019

(87) PCT Pub. No.: WO2018/121877
PCT Pub. Date: Jul. 5, 2018

(65) Prior Publication Data
US 2019/0271612 A1    Sep. 5, 2019

(51) Int. Cl.
*G01J 3/00* (2006.01)
*G01M 11/02* (2006.01)
(Continued)

(52) U.S. Cl.
CPC .......... *G01M 11/0285* (2013.01); *G01J 1/00* (2013.01); *G01J 3/00* (2013.01); *G01N 21/00* (2013.01);
(Continued)

(58) Field of Classification Search
CPC .......... G01M 11/0285; G01J 1/00; G01J 3/00; G01N 21/00; G01N 25/00; G02C 2202/14
See application file for complete search history.

(56) References Cited

U.S. PATENT DOCUMENTS 3,269,267 A    8/1966    Collins
3,810,698 A    5/1974    Alaska
(Continued)

FOREIGN PATENT DOCUMENTS

CN    1702545 A    11/2005
CN    202794021 U    3/2013
(Continued)

OTHER PUBLICATIONS

Déniz et al., "Computer vision based eyewear selector", J Zhejiang Univ-Sci C (Comput & Electron), 2010, pp. 79-91, vol. 11:2.
(Continued)

*Primary Examiner* — Abdullahi Nur
(74) *Attorney, Agent, or Firm* — The Webb Law Firm (57) ABSTRACT

A method of determining outdoor characteristics of a photochromic optical article includes: determining environmental conditions for an area; positioning the optical article to face a first direction; determining a first incident irradiance on the optical article; determining a first surface temperature and first spectrum of the optical article; rotating the optical article to face a second direction; determining a second surface temperature and Full Characterization of Lens second spectrum of the optical article; determining a second incident irradiance on the optical article; and generating a prediction model of spectral transmission of the optical article. Further using environmental and climate conditions and to select a photochromic article most appropriate for an area.

20 Claims, 7 Drawing Sheets

(51) Int. Cl.
*G01N 21/00* (2006.01)
*G01N 25/00* (2006.01)
*G01J 1/00* (2006.01)

(52) U.S. Cl.
CPC ......... *G01N 25/00* (2013.01); *G02C 2202/14* (2013.01)

(56) References Cited

U.S. PATENT DOCUMENTS

| | | | |
|---|---|---|---|
| 7,214,456 | B2 | 5/2007 | Iftime et al. |
| 9,895,722 | B2 | 2/2018 | Riddle et al. |
| 10,688,522 | B2 | 6/2020 | Lynch et al. |
| 2010/0296081 | A1* | 11/2010 | Granqvist ........... F21V 23/0457 356/213 |
| 2011/0255051 | A1 | 10/2011 | McCabe et al. |
| 2014/0036334 | A1 | 2/2014 | Ohnishi |
| 2014/0053609 | A1 | 2/2014 | Bennett |
| 2014/0272468 | A1 | 9/2014 | DeMeio et al. |
| 2015/0097855 | A1 | 4/2015 | Dotan et al. |
| 2016/0279886 | A1 | 9/2016 | Lynch et al. |
| 2017/0255262 | A1* | 9/2017 | Liu ........................ G06F 3/015 |
| 2018/0299345 | A1 | 10/2018 | Koenig, II |

FOREIGN PATENT DOCUMENTS

| | | |
|---|---|---|
| CN | 103443694 A | 12/2013 |
| CN | 205538162 U | 8/2016 |
| EP | 2693261 A1 | 2/2014 |
| JP | 2011215240 A | 10/2011 |
| JP | 2016519691 A | 7/2016 |
| TW | 201414829 A | 4/2014 |
| TW | 201526997 A | 7/2015 |
| WO | 2012119159 A1 | 9/2012 |
| WO | 2015052571 A1 | 4/2015 |
| WO | 2016209236 A1 | 12/2016 |

OTHER PUBLICATIONS

Glavas et al., "Sunglasses- and Photochromic Lens-Wearing Patterns in Spectacles and/or Contact Lens-Wearing Individuals", Eye & Contact Lens, 2004, pp. 81-84, 30:2.

Lakkis et al., "Evaluation of the performance of photochromic spectacle lenses in children and adolescents aged 10 to 15 years", Clin. Exp. Optom., 2006, pp. 246-252, vol. 89:4.

"Lenses: Technology", 20/20 Opticians Handbook Interactive Online Guide, Nov. 2016, 32 & 34, Jobson Publishing LLC.

Österholm et al., "Four Shades of Brown: Tuning of Electrochromic Polymer Blends Toward High-Contrast Eyewear", ACS Appl. Mater. Interfaces, 2015, pp. 1413-1421, vol. 7.

Ouyang et al., "Factors affecting the measurement of photochromic lens performance", Colora. Technol., 2016, pp. 238-248, vol. 132.

Roberts et al., "Modern dispensing tools", Continuing Education and Training, 2006, pp. 26-31.

"Sunwear Winter's Coming", 20/20 Opticians Handbook Interactive Online Guide, Oct. 2016, 36 & 38, Jobson Publishing LLC.

* cited by examiner

SYSTEM AND METHOD FOR SELECTION OF PHOTOCHROMIC OPTICAL ARTICLES

CROSS-REFERENCE TO RELATED APPLICATION

This application is the United States national phase of International Application No. PCT/EP2016/082928 filed Dec. 30, 2016, the disclosure of which is hereby incorporated by reference in its entirety.

BACKGROUND OF THE INVENTION

Field of the Invention

The present invention relates to a system and a method of determining outdoor characteristics of a photochromic optical article.

Description of Related Art

Selection of photochromic optical articles, such as photochromic lenses, with suitable performance characteristics in an outdoor environment often includes a process that considers the needs of an individual wearer of the photochromic lenses. The needs of the wearer can depend on the environment and the climate to which the wearer is exposed. These needs can also depend on the lifestyle of the wearer because how the wearer uses the photochromic lenses might impact the characteristics of the photochromic lenses required by the wearer. Further, the wearer's individual sensitivity to factors, such as glare, can impact the characteristics of the photochromic lenses required by the wearer.

In order to determine performance characteristics of photochromic lenses, measurements may be taken on optical benches. However, these bench tests only provide a partial answer regarding the actual behavior of photochromic lenses in the outdoor environment, where photochromic lenses are commonly worn. Therefore, there is a need for a method of determining outdoor characteristics of a photochromic article, such as a photochromic lens, to better select the suitable photochromic lens for an individual wearer. There also is a need for a system of determining outdoor characteristics of a photochromic article, such as a photochromic lens, to better select the suitable photochromic lens for an individual wearer.

SUMMARY OF THE INVENTION

The present invention is directed to a method of determining outdoor characteristics of a photochromic optical article comprising: (i) determining environmental conditions for an area; (ii) positioning at least one optical article on a support in the area such that the at least one optical article is facing a first direction; (iii) determining a first incident irradiance on the at least one optical article; (iv) determining a first surface temperature of the at least one optical article and determining a first spectrum of the at least one optical article; (v) rotating at least one of the following: the at least one optical article, the support, or any combination thereof, such that the at least one optical article is facing a second direction different from the first direction; (vi) determining a second surface temperature of the at least one optical article and determining a second spectrum of the at least one optical article; (vii) determining a second incident irradiance on the at least one optical article; and (viii) generating a prediction model of spectral transmission of the at least one optical article based on at least one of the following: the first surface temperature, the first incident irradiance, the first spectrum, the second surface temperature, the second incident irradiance, the second spectrum, or any combination thereof.

The present invention is also directed to a method for selecting a photochromic optical article including: determining a living environment of an individual; determining outdoor characteristics of a photochromic optical article; and selecting at least one photochromic optical article for the individual based, at least in part, on the determined living environment and the determined outdoor characteristics.

The present invention is also directed to a system for selecting a photochromic optical article including: a module configured to determine living environment data of an individual; a photochromic optical article characterization module configured to determine outdoor characteristics data of a photochromic optical article; and a processor for computing and/or comparing the living environment data and outdoor characteristics data for providing a photochromic optical article recommendation.

BRIEF DESCRIPTION OF THE DRAWINGS

FIG. 9A-9C show plots of outdoor temperature versus average directional 360-430 irradiance (W/m$^2$) to provide a photopic transmission of 10-20% (white area) calculated by the model generated from the data collected for Lenses 4, 1 and 6 of Example 4, respectively.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Figure 1:
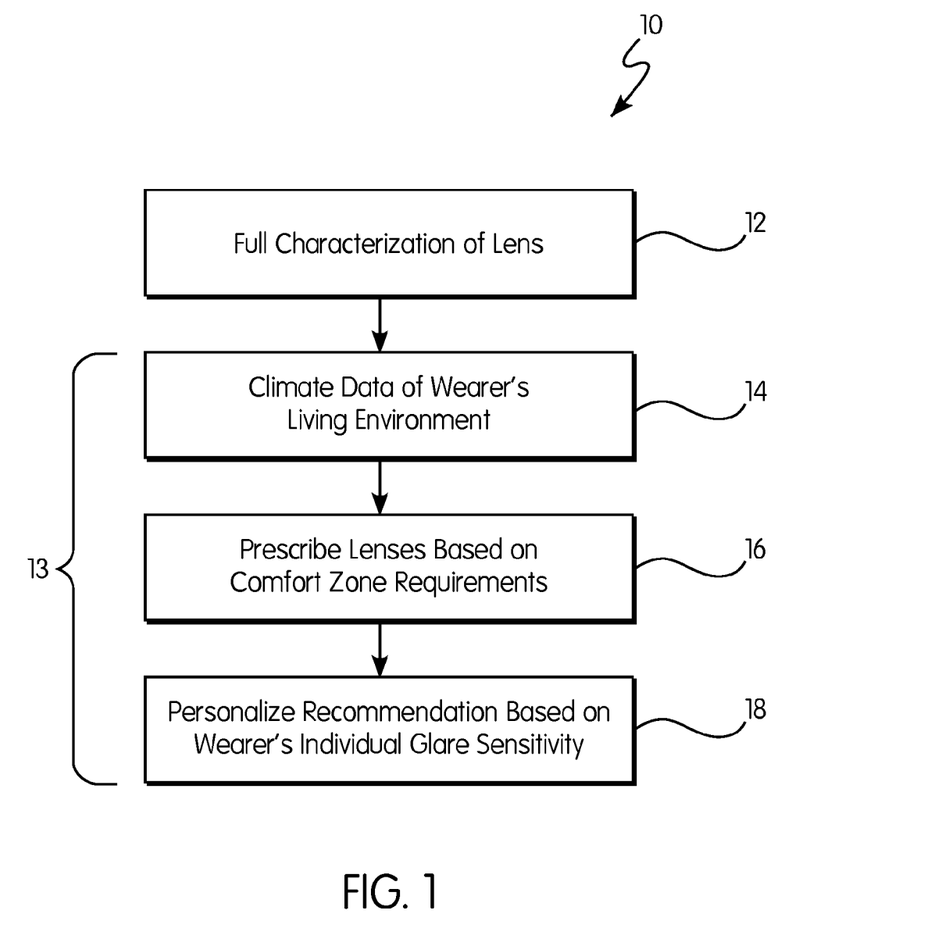
FIG. 1 shows a method of selecting a photochromic optical article.

Referring to FIG. 1, a method is outlined for selecting a photochromic optical article 10. As used herein, photochromic optical article refers to any article that exhibits photochromic properties. As used herein, the term photochromic means having an absorption spectrum for at least visible radiation that varies in response to at least actinic radiation. Non-limiting examples of photochromic optical articles include lenses (corrective lenses, non-corrective lenses, contact lenses, intra-ocular lenses, magnifying lenses, or protective lenses), goggles, visors, or face shields that exhibit photochromic properties. Other examples of photochromic optical articles include automotive transparencies, windows, display elements and devices, wearable displays, mirrors, and active and passive liquid crystal cell elements and devices that exhibit photochromic properties. The photochromic optical articles may include any art-recognized optical substrates, including organic thermosets, thermoplastics, or mineral glasses with photochromic properties, with or without added attributes such as anti-reflective coatings and/or hard multi coating (HMC) or the like. The photochromic dyes may be incorporated by any means, including but not limited to, coating, overmolding, lamination, imbibition, in mass polymerization, or printing.

The method for selecting a photochromic optical article 10 may include a method for full characterization of optical articles 12. The full characterization of optical articles may include determining the behavior of photochromic optical articles outdoors. For instance, the phototropic transmission % may be determined for optical articles, which may be a function of light and temperature. This may be determined for optical articles based on experimental measurement data, as described herein.

The method for selecting a photochromic optical article 10 may also include a selecting method 13. The selecting method 13 may include a climate data step 14, a selection step 16, and a glare sensitivity step 18.

The method for full characterization of optical articles 12 of the method for selecting a photochromic optical article 10 may include: determining environmental conditions for an area 20, positioning the optical article on a support such that the optical article is facing a first direction 22, determining a first incident irradiance of the optical article 24, determining a first surface temperature and first surface spectrum of the optical article 26, rotating the optical article such that the optical article is facing a second direction 28 different from the first direction, determining a second surface temperature and second spectrum of the optical article 30, determining a second irradiance of the optical article 32, and generating a prediction model of spectral transmission of the optical article 34.

The above-described method for selecting a photochromic article 10 is discussed in more detail below.

Method for Full Characterization of Optical Articles

Figure 2:
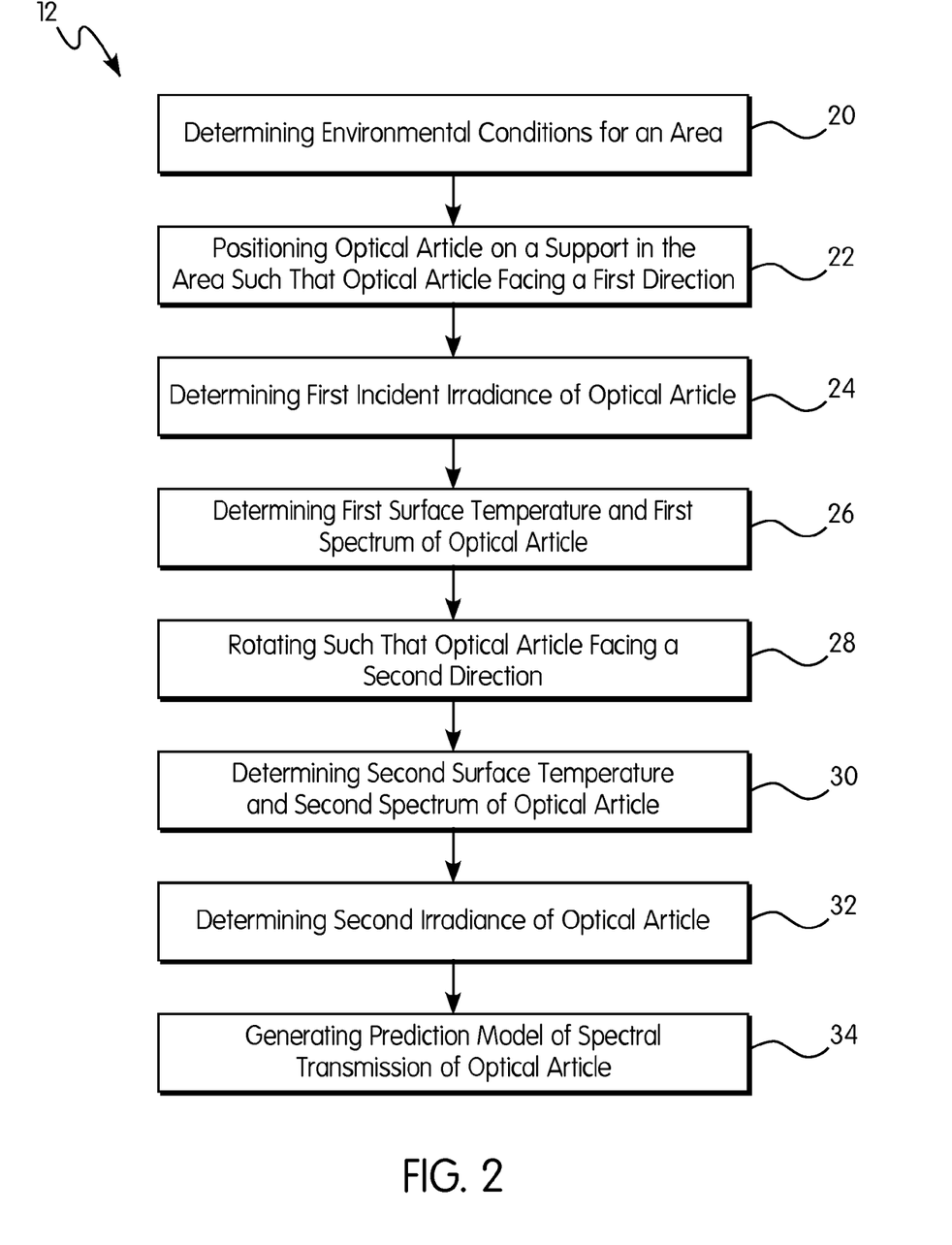
FIG. 2 shows a method of determining outdoor characteristics of a photochromic optical article.

Referring to FIG. 2, the method for full characterization of the optical articles 12 may be performed for determining the outdoor behavior of various photochromic optical articles by, for example, testing the various photochromic optical articles in real-life outdoor conditions. The method for full characterization of the optical articles 12 may include determining environmental conditions for an area 20. As used herein, an area refers to a geographic location. The geographic location may be of any size, depending on the specificity with which the environmental conditions are to be determined. For instance, the area can be as small as a neighborhood or as large as a continent. An area may refer to a village, city, state, country, set of countries, specific region within a continent, or any other geographic spatial area. An area may also refer to proximate inter-country or inter-continental regions, which share similar environmental conditions. An area may also refer to geographic areas that share the same global latitude or longitude. An area may also refer to geographic areas sharing the same altitude.

As used herein, environmental conditions refer to conditions related to climate. Non-limiting examples of environmental conditions include outdoor air temperature, percent humidity, time of day, albedo, sky conditions, global irradiance, directional irradiance, air pressure, precipitation, wind, or any other measurable climactic variable or combination thereof. During testing of optical articles to determine the environmental conditions for an area 20, these variables can be recorded at the time testing for the method for characterization of the optical articles 12 is being performed. This recorded data can be used to determine both characteristics of the optical articles being tested and typical environmental conditions for the area.

Figure 4A:
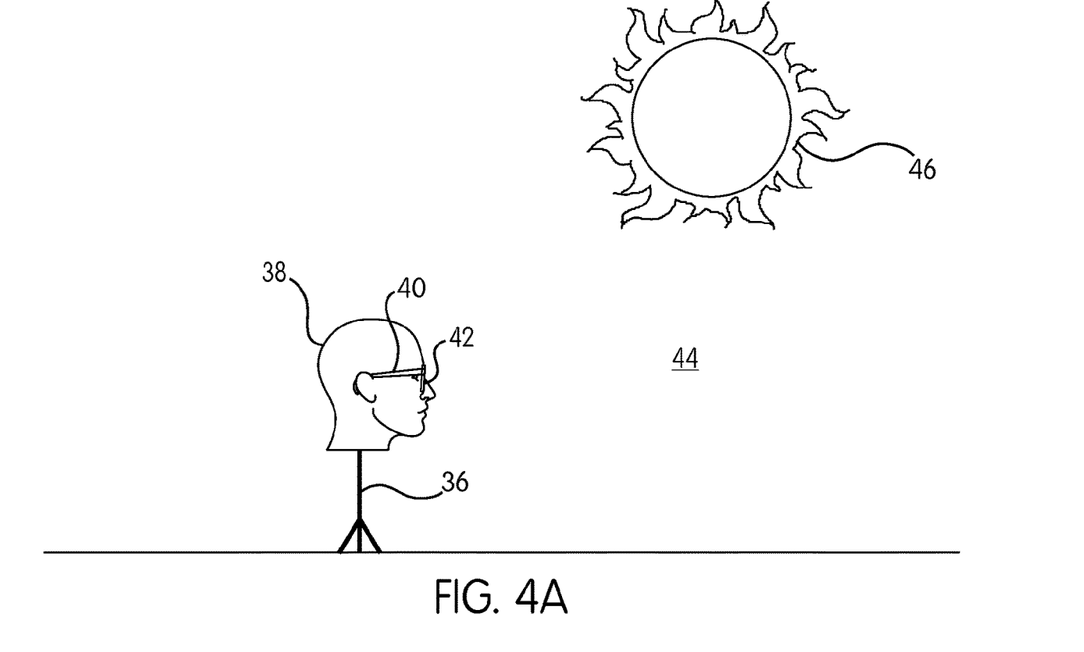
FIG. 4A shows a support structure including a mannequin head wearing photochromic optical articles facing a first direction in an area.
Figure 4B:
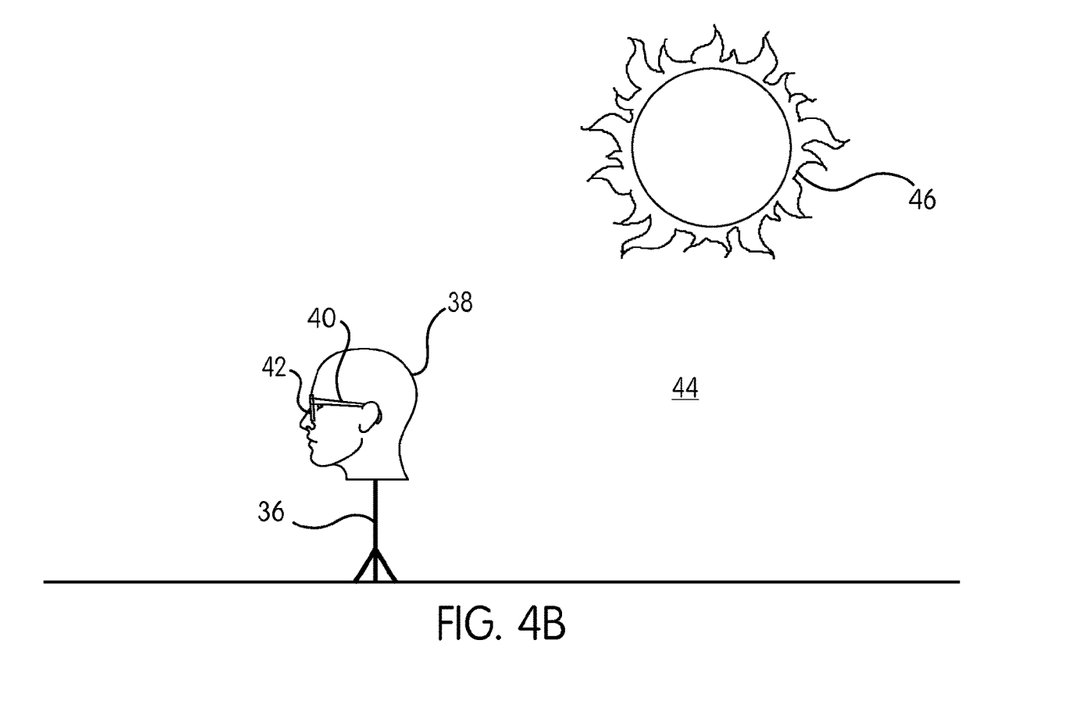
FIG. 4B shows the support structure including the mannequin head of FIG. 4A wearing the photochromic optical articles facing a second direction in the area.

Sky conditions of an area 44, for example as shown in FIGS. 4A and 4B, may include sunny, cloudy, partly cloudy, rainy, snowy, foggy, dark, or any combination thereof, at the time of testing. The outdoor air temperature may include an average outdoor air temperature throughout a year or a portion of a year. The average outdoor air temperature may include the average outdoor maximum air temperature over the 3 to 11 warmest or coldest months of the year. For example, the average outdoor air temperature may include the average outdoor maximum air temperature over the 4 to 10 warmest or coldest months. For example, the average outdoor air temperature may include the average outdoor maximum air temperature over the 5 to 9 warmest or coldest months. For example, the average outdoor air temperature may include the average outdoor maximum air temperature over the 6 to 8 warmest or coldest months. Global irradiance may be measured by placing a six-inch (15.24 centimeter) sphere having nearly ideal cosine response measuring almost a full angle of 180° on a spectroradiometer. Measurements may be made with the sphere pointing directly up towards the sky at a level of approximately three feet (0.91 meters) off the ground to measure irradiance. In the later-described tests, the sphere may generally be located 6 to 10 feet (1.8 to 3.0 meters) from the tripod having the mannequin heads. Global irradiance may include, non-exclusively, global irradiance in a 360 to 430 nm range. Directional irradiance may be measured using a two-inch (5.1 centimeter) integration sphere placed on a spectroradiometer. The sphere measures approximately ±45° of port normal. In the later-described testing, the sphere may be placed on the tripod beside the mannequin heads. A level may be used to verify that the beam holding the mannequin heads and the detector is level to the Earth. Directional irradiance may include directional irradiance in a 360 to 430 nm range.

Testing of the various optical articles may be performed at any number of areas throughout the globe to determine, with the desired degree of specificity, the behavior of the various optical articles in different types of environments (i.e., the later described first and second incident irradiances, the first and second surface temperatures, the first and second spectra, and the environmental conditions). The optical articles may be tested at any number of areas of different latitude, longitude or altitude. The optical articles may be tested at any number of geographic areas listed above. For instance, the optical articles may be tested in cities (or other areas) in which the optical articles are commonly used by wearers (or other individuals).

Figure 3:
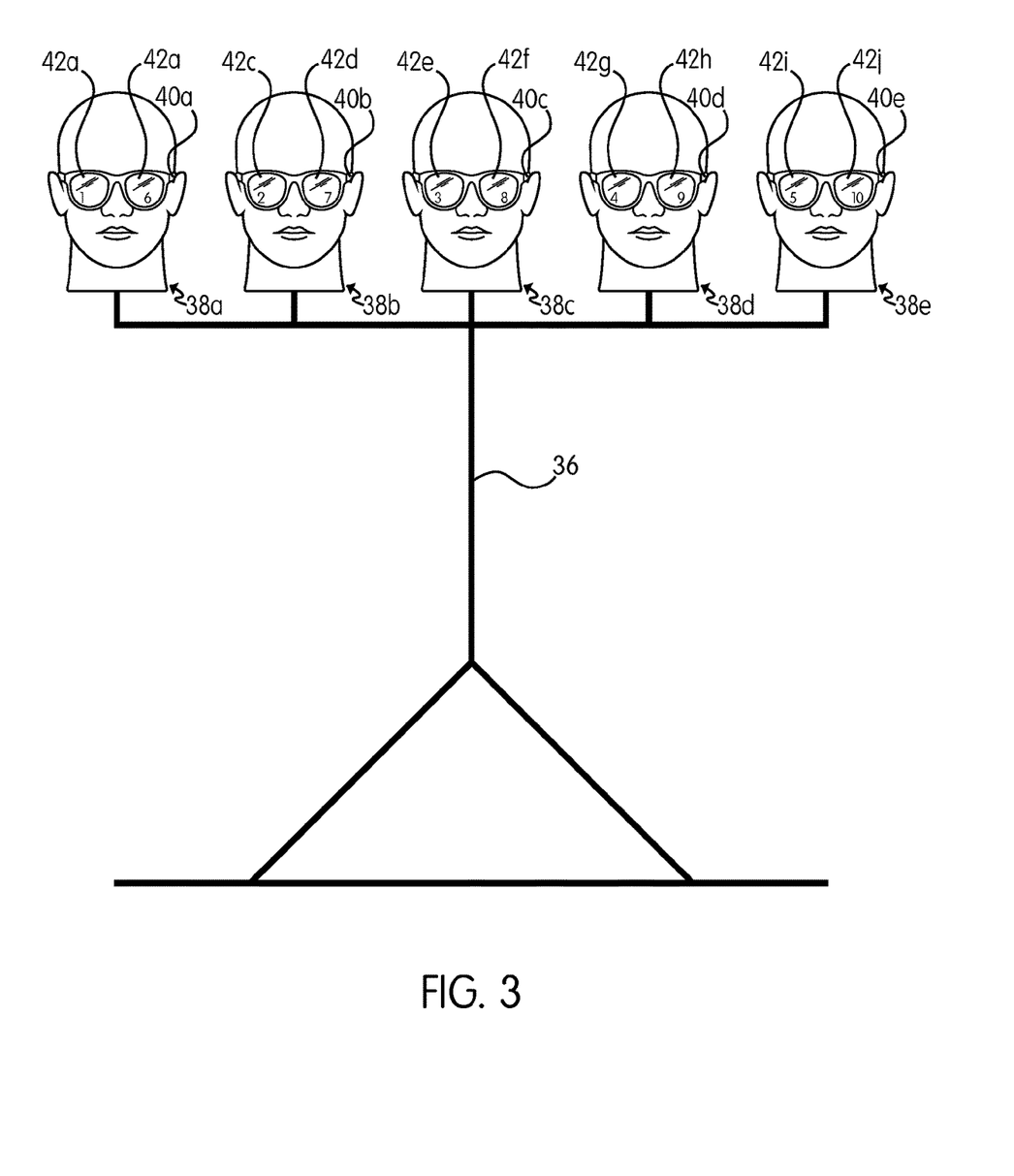
FIG. 3 shows a support structure including five mannequin heads wearing photochromic optical articles for determining the outdoor characteristics of various photochromic optical articles.

The method for full characterization of the optical articles 12 may also include positioning an optical article on a support 22. Referring to FIGS. 3 to 4B, at a test site in the outside area 44 where testing is to be performed, a support structure 36 may be provided onto which is mounted an optical article support 38. The optical article support 38 may be anything capable of supporting an optical article 42 for exposure to outdoor environmental conditions. The optical article support 38 may be, for instance, a human head or a mannequin head (as shown in FIGS. 3 to 4B). The support structure 36 may be a tripod or other structure configured to receive the at least one optical article support 38. The support structure 36 may include any number of optical article supports 38. For example, the support structure 36 may include one, two, three, four, five, six, seven, or more optical article supports 38. In FIG. 3, an exemplary support structure 36 is shown that is capable of holding five optical article supports 38, while in FIGS. 4A and 4B, the exemplary support structure 36 holds only one optical article support 38. The support structure 36 and the optical article support 38 may be separate structures or the support structure 36 and optical article support 38 may be one integrated structure. The support structure 36 may not be needed depending on the type of optical article support 38 (for example, if the optical article support 38 is a human head). A frame 40 may be provided for mounting on the optical article support 38, such as the mannequin head. The frame 40 may be used in cases where the optical article 42 is a lens. The optical article support 38 may receive the optical article 42, such that the optical article 42 may be exposed to the outdoor environmental conditions.

During testing, the optical article 42 may be positioned on the support structure 36 or optical article support 38 in the area 44 facing a first direction (see e.g., FIG. 4A). The first direction may be a horizontal direction facing a present position of the sun 46. The horizontal direction facing a present position of the sun 46 means the optical article 42 is looking toward the horizon in the direction of the sun 46. The direction of the sun 46 means the horizontal position of the sun 46 relative to the position of the sun 46 at solar noon. For instance, before solar noon, the horizontal position of the sun 46 is in a horizontal direction facing substantially east. After solar noon, the horizontal position of the sun 46 is in a horizontal direction facing substantially west. The optical article 42 may be facing any vertical direction relative to the ground. The optical article 42 may be facing a direction parallel to the ground (having a 0° angle relative to the ground) (see FIG. 4A). The optical article 42 may be angled relative to the ground so as to face a vertical direction facing up (substantially toward the sky) or a vertical direction facing down (substantially toward the ground). The position of each optical article 42 during testing may be recorded.

The method for full characterization of the optical articles 12 may also include determining a first incident irradiance of the optical article 24. Incident irradiance, as used herein, means the irradiance as collected with the two-inch (5.1 centimeter) integrating sphere collinearly facing the direction of the optical article 42. The global irradiance of the area 44 may also be determined. Irradiance measurements may be made using any sufficient means. Irradiance measurements may be made using a spectroradiometer, such as an OL-756 spectroradiometer that records data from 200-800 nm, which can be used to determine spectral data for radiation, such as UVA, UVB, UVC, visible, and 360-430 nm range radiation for activation. To determine global irradiance of the area 44, a six-inch (15.2 centimeter) global collection sphere may be placed on the spectroradiometer. After the spectroradiometer is permitted to warm up for the appropriate time and sufficiently calibrated in accordance with manufacturer's directions, the global irradiance measurement may be taken and recorded. Several global irradiance measurements of the area 44 may be taken within shorter or longer intervals of one another. To determine the first incident irradiance for each of the optical articles 42 being tested, the six-inch (15.2 centimeter) collection sphere may be removed and replaced with a two-inch (5.1 centimeter) collection sphere. The first incident irradiance for each optical article 42 may then be measured using the spectroradiometer. The first incident irradiance of the optical articles 42 being tested may be measured in any order, such as a random order, or a set order. The first incident irradiance of the optical articles 42 may be taken after the optical articles 42 have been allowed to darken fully from exposure to actinic radiation from the outdoor conditions. The first incident irradiance of each of the optical articles, after being measured, may be recorded.

The first incident irradiance of a first optical article 42 may be determined temporally proximally to the first incident irradiance of a second (and subsequent) optical article 42, with the first and second optical articles 42 having the same or different photochromic effects. As used herein, temporally proximally, means that the time between the measurement of the first optical article 42 is close enough in time to the measurement of the second (and subsequent) optical article 42 that the characteristic being measured for both optical articles 42 (which is the same) does not appreciably change in that time. Temporally proximally may mean that the measurements are taken within several seconds to several minutes of one another, such as from within 30 seconds to 30 minutes of one another. For example, within 1-20 minutes of one another. For example, within 2-10 minutes of one another. For example, within 4-5 minutes of one another.

The method for full characterization of the optical articles 12 may also include determining a first surface temperature and first surface spectrum of the optical article 26. The first surface temperature and first surface spectrum of the optical article 42 may be determined using any sufficient method. The first surface temperature may be determined using any sufficient means, such as by using an infrared (IR) temperature gun. The first surface spectrum may be determined using any sufficient means, such as a spectrometer. The spectrometer may be a JAZ spectrometer that records lens transmission measurements in the range from 350-1000 nm.

Information from the JAZ spectrometer measurements that may be obtained include L a* b* color, L C h color, ultraviolet (UV) protection, and blue light filtering. The photopic transmission % may also be determined from this data. Photopic transmission %, as used herein, refers to the spectral weighted transmittance associated with the vision of the eye under well-lit conditions and defined by the 1931 CIE photopic luminosity function. To determine the first surface temperature and first surface spectrum of the optical article 42 facing the first direction during testing, the IR temperature gun and spectrometer may be powered on and allowed to warm up for the appropriate time. The IR temperature gun and spectrometer may be calibrated, as appropriate.

During testing, the first surface temperature of each optical article 42 being tested may be measured by holding the IR temperature gun proximate each optical article 42, in turn, to take the temperature measurement. The IR temperature gun may be held several inches, such as 1-12 inches (2.5-30.5 centimeters), such as 3-9 inches (7.6-22.9 centimeters), or such as 4-6 inches (10.2-15.2 centimeters) from the optical article 42 and the temperature determined and recorded. When reading the first surface temperatures of multiple optical articles 42 in sequence, the first surface temperature of the optical article 42 may be determined in any order. The first surface temperatures of the optical articles 42 may be determined in a set order, such as from left to right.

During testing, the first spectrum of each optical article 42 may be determined using the spectrometer. The first spectrum refers to the light transmitted through the lens visible wavelength range (380-800 nm). Each optical article 42 being tested may be removed from its holder, if necessary, and its first spectrum read by the spectrometer. This may be repeated for each optical article 42 being tested. The first spectra of the optical articles 42 being tested may be performed in any order. Referring to FIG. 3, the measurement of the first spectra of the optical articles 42*a*-42*j* being tested may be performed in a set order, such as reading all of the left optical articles 42*a*, 42*c*, 42*e*, 42*g*, 42*i* followed by all of the right optical articles 42*b*, 42*d*, 42*f*, 42*h*, 42*j*. With continued reference to FIG. 3, an order for reading the first spectra during a test being conducted with multiple optical articles 42*a*-42*j* is shown. The numbers in the bottom left corner of the optical articles (1-10) show the order with which the first spectra of the optical articles 42*a*-42*j* may be performed (i.e., with the first spectra of the left optical articles 42*a*, 42*c*, 42*e*, 42*g*, 42*i* in the frame 40*a*-40*e* each first being determined, followed by the first spectra of the right optical articles 42*b*, 42*d*, 42*f*, 42*h*, 42*j* in the frame 42*a*-42*e* each being determined). This order may be followed to avoid having the right optical articles 42*b*, 42*d*, 42*f*, 42*h*, 42*j* begin to fade when removed from the frame 40*a*-40*e* before testing using the spectrometer. The first spectrum of each optical article 42*a*-42*j*, once determined, may be recorded.

The first surface temperature and first spectrum of a first optical article 42 may be determined temporally proximally to the first surface temperature and first spectrum of a second (and subsequent) optical article 42, with the first and second optical articles 42 having the same or different photochromic effects. As used herein, temporally proximally means that the time between the measurement of the first optical article 42 is close enough in time to the measurement of the second (and subsequent) optical article 42 that the characteristic being measured for both optical articles 42 (which is the same) does not appreciably change in that time. Temporally proximally may mean that the measurements are taken within several seconds to several minutes of one another, such as from within 30 seconds to 30 minutes of one another. For example, within 1-20 minutes. For example, within 2-10 minutes. For example, within 4-5 minutes of one another.

The method for full characterization of the optical articles 12 may also include rotating the optical article such that the optical article is facing a second direction 28 (see e.g., FIG. 4B). The second direction may be a horizontal direction different from the first direction. The second direction may be a horizontal direction facing away from present position of the sun 46. The second direction may be a horizontal direction also facing the sun 46 (like the first direction) but facing the sun 46 at a different angle (i.e., facing a different direction relative to the horizon yet still facing the direction of the sun 46). For example, the first direction may be due east, and the second direction may be a rotation of 45° relative to the horizon such that the second direction is due northeast or due northwest. The second direction may be substantially opposite the first direction, such as rotating the optical article 42 180°±3° relative to the horizon. For example, the first direction may be due east, and the second direction may be a rotation of 180° relative to the horizon such that the second direction is due west.

The optical article 42 may be rotated from facing the first direction to facing the second direction by any sufficient means. The optical article 42 itself may be rotated so that it is facing the second direction. The optical article support 38 may be rotated so that the optical article 42 is facing the second direction. The frame 40 containing the optical article 42 may be rotated so that the optical article 42 is facing the second direction. The support structure 36 may be rotated so that the optical article 42 is facing the second direction. Any combination of these may be rotated so that the optical article 42 is facing the second direction.

The method for full characterization of the optical articles 12 may also include determining a second surface temperature and second spectrum of the optical article 30. The second spectrum refers to the light transmitted through the lens visible wavelength range (380-800 nm). The second surface temperature and the second spectrum of the optical article 42 may be determined with the optical article 42 facing the second direction. The second surface temperature and the second spectrum may be determined using the same steps described for determining the first surface temperature and the first spectrum.

The second surface temperature and second spectrum of a first optical article 42 may be determined temporally proximally to the second surface temperature and second spectrum of a second (and subsequent) optical article 42, with the first and second optical articles 42 having the same or different photochromic effects. As used herein, temporally proximally, means that the time between the measurement of the first optical article 42 is close enough in time to the measurement of the second (and subsequent) optical article 42 that the characteristic being measured for both optical articles 42 (which is the same) does not appreciably change in that time. Temporally proximally may mean that the measurements are taken within several seconds to several minutes of one another, such as from within 30 seconds to 30 minutes of one another. For example, within 1-20 minutes. For example, within 2-10 minutes. For example, within 4-5 minutes of one another.

The method for full characterization of the optical articles 12 may also include determining a second incident irradiance of the optical article 32. The second incident irradiance of the optical article 42 may be determined with the optical article 42 facing the second direction. The second incident irradiance of the optical article 42 may be determined using the same steps described for determining the first incident irradiance.

The second incident irradiance of a first optical article 42 may be determined temporally proximally to the second incident irradiance of a second (and subsequent) optical article 42, with the first and second optical articles 42 having the same or different photochromic effects. As used herein, temporally proximally, means that the time between the measurement of the first optical article 42 is close enough in time to the measurement of the second (and subsequent) optical article 42 that the characteristic being measured for both optical articles 42 (which is the same) does not appreciably change in that time. Temporally proximally may mean that the measurements are taken within several seconds to several minutes of one another, such as from within 30 seconds to 30 minutes of one another. For example, within 1-20 minutes. For example, within 2-10 minutes. For example, within 4-5 minutes of one another.

The above-described tests in the method for full characterization of the optical articles 12 may be conducted on the optical articles 42 between sunrise and sunset. In other words, determining the environmental conditions for the area, determining the first and second irradiances, determining the first and second surface temperatures, and determining the first and second spectra may be performed between sunrise and sunset. These tests may be performed 30 minutes to 3 hours prior to or after solar noon such that the differences between measurements taken with the optical articles 42 facing towards the sun 46 are different than the measurements taken with the optical articles 42 facing away from the sun 46. These tests may be performed 1 to 3 hours prior to or after solar noon. The above-described tests may be performed at a plurality of different times in a day. In other words, determining the environmental conditions for the area, determining the first and second irradiances, determining the first and second surface temperatures, and determining the first and second spectra may be performed at a variety of times during the course of the day.

It is noted that further tests may be performed with the optical article 42 facing further directions, such as a third direction, fourth direction, fifth direction, and any number of additional directions. Additionally, the surface temperature, spectrum, and incident irradiance of the optical article 42 facing the further directions may be determined using the procedures described above.

The method for full characterization of the optical articles 12 may also include generating a prediction model of spectral transmission of the optical article 42. The prediction model may be generated based the above-described collected data, including the first and second incident irradiance, first and second surface temperatures, first and second spectra, global irradiance, environmental conditions, or any combination thereof. A prediction model may be generated for each optical article 42 tested. The prediction model may generate a predicted photopic transmission % based on the input of outdoor temperature and average directional irradiance, such as the directional irradiance in the 360-430 nm range (i.e., photopic transmission % may be written as a function of outdoor temperature and average directional irradiance based on the data). This model may allow prediction of photopic transmission % of the optical article 42 based on the outdoor temperature and average directional irradiance for any area 44 (even those not tested) so as to determine whether an optical article 42 is suitable for that area 44. A statistical software may be used to generate the prediction model. The prediction model may show a target photopic transmission % of the optical articles 42 based on certain combinations of outdoor temperature and directional irradiance, such that a target of 5-50% photopic transmission, such as 10-20%, 10-15%, 15-20%, 5-25%, or 5-20%, is shown as a function of outdoor temperature and directional irradiance. The photopic transmission % is based on the optical article 42 being darkened from exposure to actinic radiation.

It is noted that the steps of the method for full characterization of the optical articles 12 shown in FIG. 2 may be performed in sequences other than those shown in FIG. 2.

Selection Method

A. Climate Data Step

An optical article 42, such as a lens, may be selected using a selection method that is based, at least in part, on the climate data of a wearer's living environment. As used herein, living environment may include at least one of the following: average outdoor air temperature, exposure to radiation, or any combination thereof. Radiation may include UVA, UVB, blue light, visible light, infrared light, or any combination thereof. Determining the living environment of the wearer may use the location where the wearer resides or spends a sufficient amount of time (such as on vacation, a second residence, work travel, and the like). This location may be tracked or located using maps that provide exact coordinates (longitude and latitude) of the location. The environmental conditions for that location may be determined (either through testing or based on statistics for the location already known). Databases and modeling software like Cesora, Solargis, or the National Renewable Energy Laboratory (NLRE) may be used for this purpose. Thus, the wearer's exposition to UVA, UVB, blue light, visible light, infrared light, temperature, and the like, on a daily, weekly, monthly, seasonally, or yearly basis may be determined. The average of these factors over the course of a year may be considered, or the average over a portion of the year. For example, the average maximum outdoor air temperature over the 12 months of the year for a location may be used. The average maximum outdoor air temperature during a portion of the year, such as the 3, 4, 5, 6, 7, 8, 9, 10, or 11 warmest or coldest months of the year may also be used. The maximum average outdoor air temperature may be used for the entire year or a portion of the year to more closely represent daylight temperatures, which are the temperatures when the photochromic optical article 42 will darken from exposure to actinic radiation. Additionally, the difference between the warmest eight months' maximum outdoor air temperature and the average maximum outdoor air temperature for the entire year may be useful for separating the needs of more consistent coastal regions from the greater temperature variability needs of a continental region. The type of outdoor air temperature average for the location to be considered during the selection method may be chosen based on any other number of factors.

Based on the data collected, as described in the method for full characterization of optical articles 12 and the climate data of the wearer's living environment 14, the behavior of different optical articles 42 may be predicted using the prediction model. The average twelve-month temperature of the wearer's location, or other average temperature data, may be used with the average directional irradiance of the wearer's location to determine a predicted photopic transmission % for each optical article 42.

B. Select Lenses Based on Wearer's Comfort Zone Requirements

From the characterization of the optical articles 42 based on the wearer's living environment, optical articles 42 may be selected/recommended based on the wearer's comfort zone requirements 16. Comfort zone refers to a range of photopic transmission %. Optical articles 42 that have a photopic transmission when activated by actinic radiation in the range of 5-50%, such as 10-20%, 10-15%, 15-20%, 5-25%, or 5-20%, for the wearer's location (based on outdoor air temperature and average directional irradiance) may fall within this comfort zone and may be selected. See e.g., Graphs 4A-4C in the Examples below.

Further, the wearer's habits may be considered when selecting optical articles based on the wearer's comfort zone requirements 16. The wearer's habits may be determined through a questionnaire or other means. Habits may include time spent outside, time spent inside, particular hobbies, common travel locations, and the like. For example, for a wearer spending more time outdoors, an optical article 42 that provides darker characteristics when exposed to actinic radiation (better radiation protection) may be selected based on the wearer's increased time exposed to such radiation. Therefore, the optical article 42 for a wearer may be selected recommended based, at least in part, on the prediction model and the determined living environment of the wearer.

C. Personalize Recommendation Further Based on Wearer's Individual Glare Sensitivity A step beyond personalization linked to environment or habits of the wearer may be used to further personalize the recommendation based on the wearer's individual glare sensitivity 18. Sensitivity to glare means the visual discomfort and/or disability one experiences when exposed to visible radiation. Glare discomfort is the subjective feeling of an annoying or painful sensation caused by high luminous intensity in the field of view. It can be assessed using a discomfort rating's scale (Ref: De Boer, 1967). Glare disability is the reduction in visibility caused by high luminous intensity in the field of view. Clinically, time to recover initial state of visual performance after glare exposure is also an indicator of sensitivity to glare.

The sensitivity to glare may be determined using objective means, subjective means, or some combination thereof, to determine the wearer's glare sensitivity from very sensitive to minimally sensitive. The optical article 42 for the wearer may be selected beyond its environmental conditions, at least in part, by the results from the wearer's sensitivity to glare. A highly glare-sensitive individual may be most comfortable and/or efficient with a photopic transmission which is selected below the photopic transmission level that would be required normally by its living environment for example: 15%-20% instead of 20%-25%, 10%-15% instead of 15%-20%, and 5%-10% instead of 10-15%.

Since the photochromic articles behave differently depending on the environmental conditions, an appropriate product may be further selected by taking into account environment and individual glare sensitivity of the wearer.

A questionnaire may be used to determine glare sensitivity. Glare sensitivity may be assessed using the De Boer Scale (1967) to determine the wearer's sensitivity to glare from "unbearable" to "just noticeable". Glare sensitivity may be assessed using ophthalmic device equipment, such as the Brightness Acuity Tester (BAT). Depending on the determined glare sensitivity of the wearer, the selection of the optical article 42 may be adjusted.

The following examples are presented to demonstrate the general principles of the invention. The invention should not be considered as limited to the specific examples presented.

D. System for Selecting a Photochromic Optical Article

Figure 5:
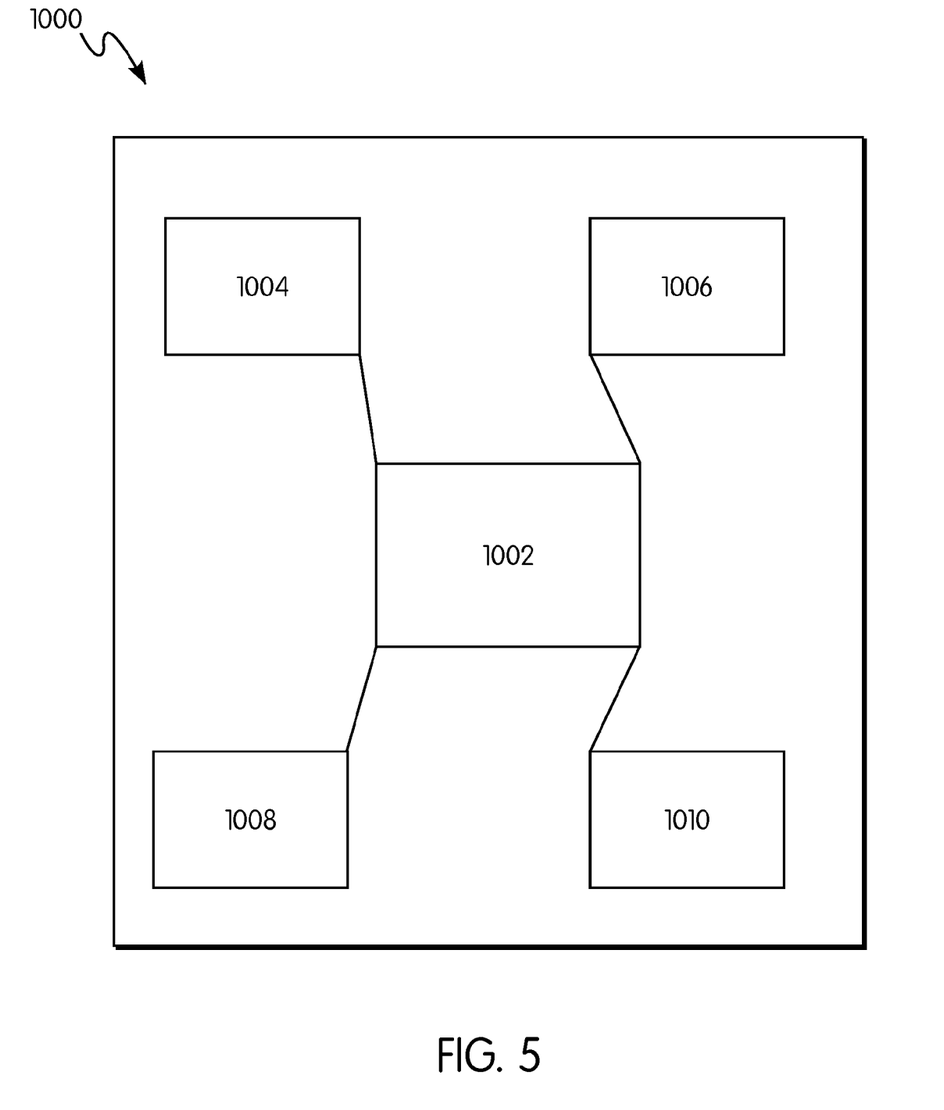
FIG. 5 shows a system for selecting a photochromic optical article.

Referring to FIG. 5, a system 1000 for selecting a photochromic optical article may include a processor 1002 for computing data from various modules 1004, 1006, 1008, 1010.

The system 1000 may include an environment module 1004 configured to determine living environment data of an individual. The module may take information regarding an area in which the individual lives to determine the living environment data of the individual. The information regarding the living environment of the individual may be determined by the environment module 1004, as previously described (by testing in that area or from data already available regarding that area).

The system 1000 may also include a photochromic optical article characterization module 1006 configured to determine outdoor characteristics of a photochromic optical article (as previously described based on the method for full characterization of optical articles).

The system 1000 may also include a climate data determination module 1008 which has worldwide data on climate conditions in various regions of the country. This climate data determination module 1008 may include climate data on the environmental conditions of the individual or that specific area's data may not be in the climate data determination module 1008, in which case areas that are included in the climate data determination module 1008 having similar environmental conditions may be used as an approximation or comparison.

The system 1000 may also include a glare module 1010 for determining data representative of glare sensitivity of an individual, as described above.

The processor 1002 may, for example, compute the living environment data and outdoor characteristics data from the environment module 1004 and the photochromic article characterization module 1006 to provide a photochromic optical article recommendation.

E. Application and/or Computer Program Product for Executing the Methods

A computer program product may be provided that includes at least one non-transitory computer-readable medium including at least one set of program instructions that, when executed by at least one computer including at least one processor, cause the at least one computer to carry out the steps of one of the above-described methods (e.g., characterization and selection method). The computer may be in the form of a smartphone, tablet computer, personal computer, personal digital assistant, portable computer, palmtop, mobile device, mobile telephone, server, wearable device, or any other type of computing device. The computer program may be stored on the device in any form, including as a software application, such as a mobile application. For instance, the characterization and/or selection method previously described may be executed using the computer program product in the form of a mobile application downloaded on a smartphone or other device.

Example 1

Global Testing of Photochromic Optical Articles

Testing was conducted at different locations around the world at different times of the year. Table 1 below shows a table of the test locations organized by increasing latitude.

TABLE 1

| City | State | Country | Latitude | Longitude |
|---|---|---|---|---|
| Chonburi | N/A | Thailand | 13.443 | 101.010 |
| Laguna | N/A | Philippines | 14.287 | 121.074 |
| Key West | Florida | USA | 24.568 | −81.757 |
| Pinellas Park | Florida | USA | 27.862 | −82.711 |
| New River | Arizona | USA | 33.921 | −112.100 |
| Hiawassee | Georgia | USA | 34.924 | −83.723 |
| Flagstaff | Arizona | USA | 35.280 | −111.723 |
| Las Vegas | Nevada | USA | 36.126 | −115.148 |
| Newark | California | USA | 37.536 | −122.034 |
| Golden | Colorado | USA | 39.736 | −105.193 |
| Monroeville | Pennsylvania | USA | 40.431 | −79.765 |
| Rome | N/A | Italy | 41.859 | 12.519 |
| Portland | Oregon | USA | 45.561 | −122.600 |
| Sauk Rapids | Minnesota | USA | 45.608 | −94.138 |
| Solden | N/A | Austria | 46.535 | 10.605 |
| Paris | N/A | France | 48.732 | 2.411 |
| Vancouver | N/A | Canada | 49.266 | −123.096 |
| Berlin | N/A | Germany | 52.479 | 13.414 |

Example 2

Preparation for Testing

Various photochromic optical lenses (see e.g., Lens 1-8 below) were tested. The various photochromic optical lenses each have different photochromic characteristics. A typical testing day consisted of outside morning and afternoon sessions at the above-described global locations, avoiding solar noon by ±2 hours. Mannequin heads were placed on a tripod having the capacity to hold up to seven heads. Hats were placed on some of the mannequin heads. All equipment, including an OL-756 spectroradiometer, a JAZ spectrometer, and a LED light source were assembled and powered on. Assembly of the spectroradiometer included attaching a six inch (15.24 centimeter) global collection sphere. The JAZ spectrometer records a lens transmission measurement from the 350-1000 nm range, meaning at least the following data could be extracted from measurements of the JAZ spectrometer: L a* b* color, L C h color, UV protection, and blue light filtering. Photopic transmission % is pulled out from the readings from the JAZ spectrophotometer. The OL-756 spectroradiometer records data from 200-800 nm, meaning spectral data for the following irradiance ranges of interest can be processed: UVA, UVB, UVC, visible (W/m$^2$ or Klux), and the 360-430 nm radiation range for activation.

Example 3

Testing of Lenses

The tripod having the mannequin heads mounted thereon was placed such that the mannequins were all facing a first direction toward the sun. After allowing all equipment to warm up for 15-30 minutes, three global irradiance spectra were collected using a six-inch (15.24 centimeter) collecting sphere. The six-inch (15.24 centimeter) collection sphere was removed and a two inch (5.08 centimeter) sphere was installed on the spectroradiometer. This two inch (5.08 centimeter) sphere was attached to the tripod facing the same direction as the mannequin heads. Three directional irradiance spectra were collected. These directional scans were performed prior to each set of transmittance measurements. Ten minutes were allowed to elapse first to allow the lenses to fully darken. The environmental conditions were recorded, including outdoor temperature and humidity. Sky conditions were also recorded (e.g., sunny, cloudy, partly cloudy). Then, the temperature of each lens going from left to right was recorded using an IR temperature gun by holding the IR temperature gun approximately four inches (10.16 centimeters) away from each lens while measuring the temperature. Transmittance spectral data was then collected for each of the lenses. First, all of the left lenses of the mannequins were measured, followed by all of the right lenses. The spectral data for each lens was collected using the JAZ spectrometer, and these measurements were recorded.

The mannequins were then rotated approximately 180° such that each mannequin was facing a second direction away from the sun. Environmental and sky conditions were again recorded. The directional irradiance, lens temperature, and transmittance spectral data were collected from each lens facing this second direction as described above. The two-inch (5.08 centimeter) detector collection sphere was removed and the six-inch (15.24 centimeter) sphere placed back on spectroradiometer. Three global irradiance spectra were again collected.

The above tests were run at each global location and for each of Lens 1-8 (described below), and other lens products, as needed.

Example 4

Test Results and Generating the Prediction Model

Figure 6:
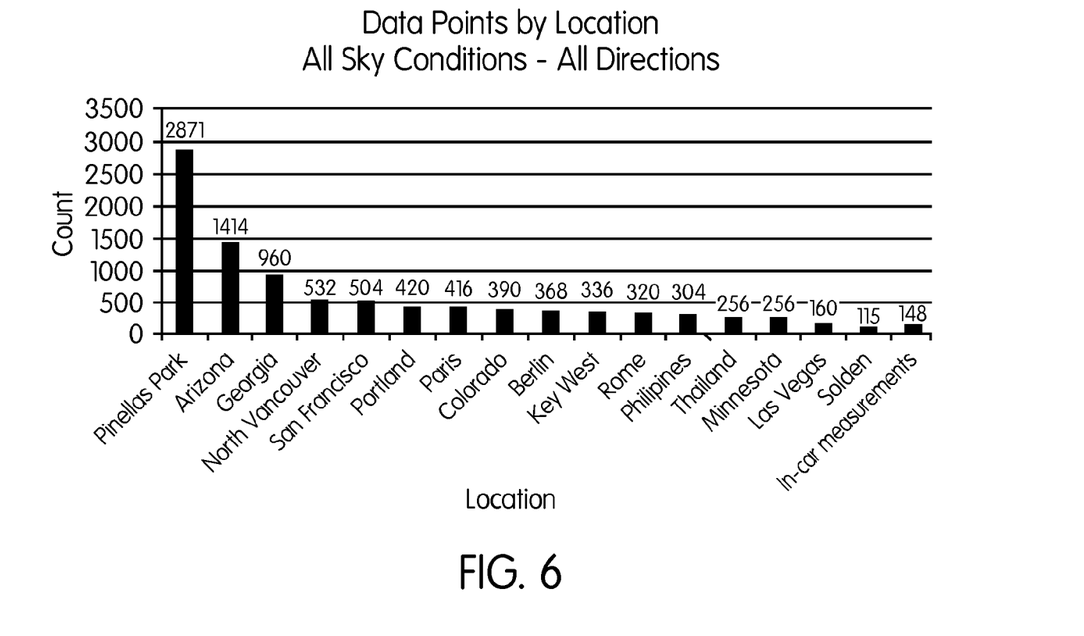
FIG. 6 illustrates the number of data points by global location for the test according to Example 4 under all sky conditions and all directions relative to the sun.

Overall, using the above-described process, nearly 10,000 data points were collected. Testing was performed on 65 different lenses, with the results from Lens 1-8 included herein. Tests were performed in various directions relative to the sun and in various sky conditions. Nearly 150 measurements were made inside of a car. FIG. 6 shows the number of data points collected by global location.

Figure 7:
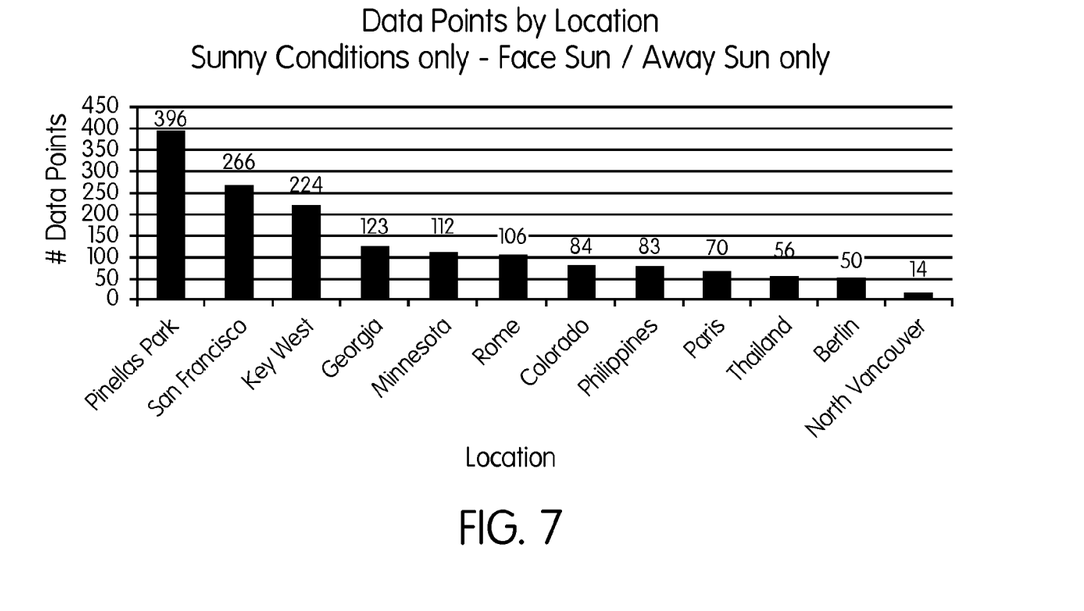
FIG. 7 illustrates the number of data points by global location for the test according to Example 4 under sunny conditions and in directions of facing towards the sun and facing away from the sun only.

For creating the prediction model, the two directions of facing toward the sun and facing away from the sun, both in sunny conditions were included. This resulted in 1,600 data points for 35 different lenses. No data from mannequins wearing a hat were included. FIG. 7 shows the data points collected by location for the data used to create the prediction models.

Figure 8:
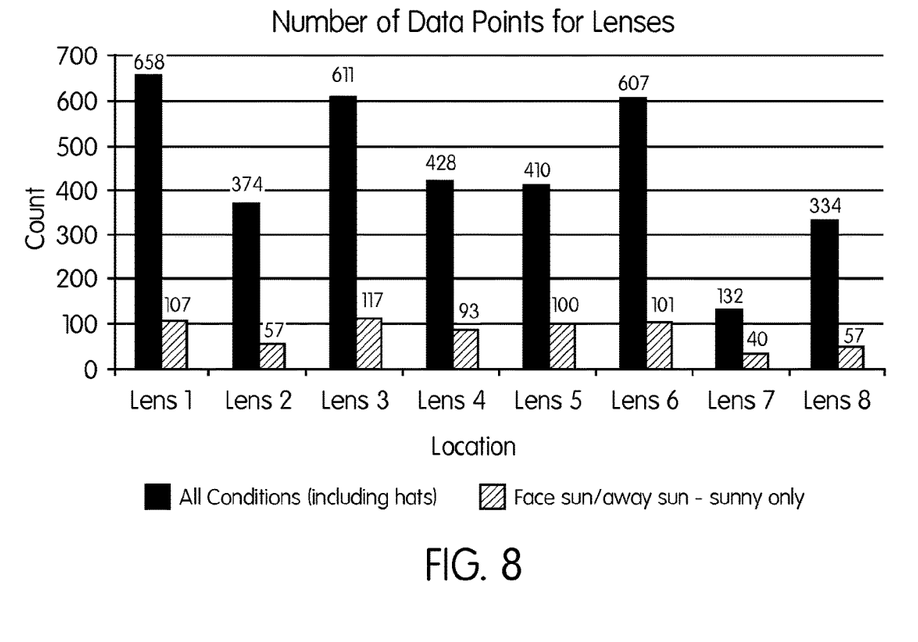
FIG. 8 shows the number of data points achieved for eight specific lenses according to the test of Example 4.

The number of data points collected for eight specific lenses are shown in FIG. 8. The relevant data points for each of the lenses tested, including Lens 1-8, were compiled, and Table 1 below shows the data collected for Lens 1.

TABLE 1

| Location | Mean(Lens Temp (° C.)) | Mean(Outdoor Temp (° C.)) | Mean(Average Global KLUX) | Mean(Average Global 360-430 irradiance) | Mean(Average Global UVA) | Mean(Average Directional KLUX) |
|---|---|---|---|---|---|---|
| Arizona | 39.0 | 39.7 | 175.0 | 123.2 | 74.8 | 47.6 |
| Berlin | 26.1 | 22.2 | 49.4 | 29.5 | 35.6 | 23.9 |
| Colorado | 14.3 | 12.5 | 37.7 | 22.4 | 11.0 | 9.7 |
| Florida | 31.9 | 30.9 | 134.6 | 90.0 | 53.5 | 35.2 |

TABLE 1-continued

| | | | | | | |
|---|---|---|---|---|---|---|
| Georgia | 23.8 | 23.8 | 89.0 | 58.2 | 33.6 | 16.5 |
| Key West | 28.8 | 25.6 | 60.6 | 37.0 | 20.1 | 32.3 |
| Las Vegas | 34.3 | 30.0 | 70.4 | 38.5 | 19.6 | 35.5 |
| North Vancouver | 7.6 | 6.7 | 11.5 | 7.1 | 3.8 | 11.0 |
| Paris | 21.7 | 18.8 | 50.8 | 30.8 | 16.6 | 18.5 |
| Pinellas Park | 27.4 | 26.6 | 88.7 | 50.7 | 26.0 | 31.3 |
| Portland Airport | 9.2 | 6.9 | 16.3 | 10.9 | 6.0 | 18.2 |
| Rome | 37.5 | 30.4 | 83.9 | 48.2 | 25.4 | 31.1 |
| San Francisco/Newark | 19.1 | 13.6 | 40.0 | 23.0 | 12.5 | 33.1 |
| Sölden | 13.4 | 10.4 | 76.9 | 48.8 | 29.2 | 41.0 |
| TOI | 23.7 | 23.1 | 58.2 | 34.8 | 18.8 | 37.5 |
| TOI (CAR) | 23.4 | 24.1 | | | | 7.0 |
| TOPI | 35.9 | 34.8 | 96.9 | 56.4 | 29.7 | 14.7 |
| TOTL | 36.8 | 35.9 | 73.2 | 44.0 | 24.0 | 25.3 |
| Xcel | 4.6 | 3.3 | | | | 42.0 |

| Location | Mean(Average Directional 360-430 irradiance) | Mean(Average Directional UVA) | Global UVA + UVB + UVC/Average global visible | directional UVA + UVB + UVC/Average directional visible irradiance) |
|---|---|---|---|---|
| Arizona | 26.5 | 12.6 | 0.086 | 0.082 |
| Berlin | 11.8 | 5.5 | 0.068 | 0.060 |
| Colorado | 5.4 | 1.5 | 0.061 | 0.038 |
| Florida | 19.3 | 9.2 | 0.081 | 0.067 |
| Georgia | 9.1 | 4.2 | 0.082 | 0.058 |
| Key West | 17.8 | 8.7 | 0.072 | 0.068 |
| Las Vegas | 17.6 | 8.0 | 0.059 | 0.043 |
| North Vancouver | 4.0 | 1.5 | 0.077 | 0.051 |
| Paris | 10.2 | 5.2 | 0.079 | 0.072 |
| Pinellas Park | 17.4 | 8.6 | 0.063 | 0.055 |
| Portland Airport | 8.5 | 3.6 | 0.085 | 0.068 |
| Rome | 15.4 | 7.2 | 0.064 | 0.043 |
| San Francisco/Newark | 14.2 | 5.5 | 0.060 | 0.042 |
| Sölden | 25.0 | 13.7 | 0.080 | 0.077 |
| TOI | 18.7 | 8.8 | 0.070 | 0.072 |
| TOI (CAR) | 1.8 | 0.0 | | 0.002 |
| TOPI | 8.3 | 4.0 | 0.068 | 0.052 |
| TOTL | 12.9 | 6.3 | 0.073 | 0.055 |
| Xcel | 23.4 | 11.3 | | 0.070 |

From this actual data, a model was built for each lens tested to obtain a predicted Y (photopic transmission %) based on any given outdoor temperature (T) and directional irradiance (I). For Lens 1, the model generated from the data indicates that it was expected to obtain 11.1% T under a 23° C. outdoor air temperature and 30 W/m² directional irradiance in the range of 360-430 nm. The following equation shows the relationship between photopic transmission, outdoor temperature (° C.), and irradiance (360-430 nm) for Lens 1:

$$Y(\% \ T)=e^{[(1.7346)+(0.535)*(T)-(0.017937)*(I)+(T-21.129)*(I-18.5152)*(0.0000167)]}$$

The $R^2$ value for this model was 0.71. An equation was generated for each of the lenses tested.

Figures 9A, 9C:
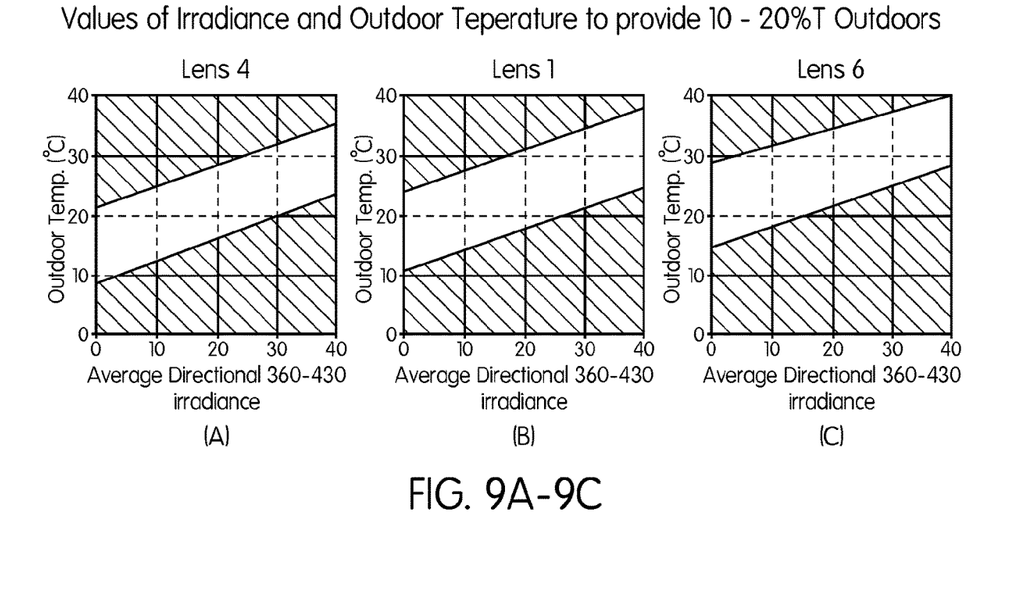

From these equations, a target photopic transmission of 10-20% was plotted in a graph of outdoor temperature (° C.) vs. average directional 360-430 irradiance (W/m²). This is shown in FIG. 9A-9C, respectively. The white area in FIG. 9A-9C is the combination of outdoor temperature and average directional irradiance that will produce a photopic transmission of 10-20% for Lenses 4, 1, and 6, respectively (photopic transmission %=15%±5%).

Combining this information along with average temperature and irradiance for different regions of the country (or world) allows the appropriate lens to be selected for wearers in that region.

The present invention further includes the subject matter of the following clauses.

Clause 1: A method of determining outdoor characteristics of a photochromic optical article comprising:
  determining environmental conditions for an area;
  positioning at least one optical article on a support in the area such that the at least one optical article is facing a first direction;
  determining a first incident irradiance on the at least one optical article;
  determining a first surface temperature of the at least one optical article and determining a first spectrum of the at least one optical article;
  rotating at least one of the following: the at least one optical article, the support, or any combination thereof, such that the at least one optical article is facing a second direction different from the first direction;
  determining a second surface temperature of the at least one optical article and determining a second spectrum of the at least one optical article;
  determining a second incident irradiance on the at least one optical article; and
  generating a prediction model of spectral transmission of the at least one optical article based on at least one of the following: the first surface temperature, the first incident irradiance, the first spectrum, the second surface temperature, the second incident irradiance, the second spectrum, or any combination thereof.

Clause 2: The method of clause 1, wherein the at least one optical article comprises a first optical article and a second optical article, and wherein:
  the first surface temperature of the first optical article and the first incident irradiance on the first optical article are determined temporally proximally to the first surface temperature of the second optical article and the first incident irradiance on the second optical article; or the second surface temperature of the first optical article and the second incident irradiance on the first optical article are determined temporally proximally to the second surface temperature of the second optical article and the second incident irradiance on the second optical article; or the first spectrum of the first optical article is determined temporally proximally to the first spectrum of the second optical article; or the second spectrum of the first optical article is determined temporally proximally to the second spectrum of the second optical article, wherein the first optical article and the second optical article comprise the same or different photochromic effects.

Clause 3: The method of clauses 1 or 2, wherein the determining of the environmental conditions for the area, the determining of the first and second incident irradiances, the determining of the first surface temperature of the at least one optical article and determining the first spectrum of the at least one optical article, and the determining of the second surface temperature of the at least one optical article and determining the second spectrum of the at least one optical article are performed between sunrise and sunset.

Clause 4: The method of any of clauses 1 to 3, wherein the determining of the environmental conditions for the area, the determining of the first and second irradiances, the determining of the first surface temperature of the at least one optical article and determining the first spectrum of the at least one optical article, and the determining of the second surface temperature of the at least one optical article and determining the second spectrum of the at least one optical article are performed 30 minutes to three hours prior to or after solar noon.

Clause 5: The method of any of clauses 1 to 4, wherein the environmental conditions comprise at least one of the following: outdoor air temperature, percent humidity, time of day, time of year, albedo, sky conditions, global irradiance, directional irradiance, or any combination thereof.

Clause 6: The method of any of clauses 1 to 5, wherein the at least one optical article comprises at least one of the following: a lens, goggles, a visor, or a face shield.

Clause 7: The method of any of clauses 1 to 6, wherein the first direction is a horizontal direction facing a present position of the sun, and the second direction is a horizontal direction facing away from the present position of the sun.

Clause 8: A method for selecting a photochromic optical article comprising:

determining a living environment of an individual;

determining outdoor characteristics of a photochromic optical article; and selecting at least one photochromic optical article for the individual based, at least in part, on the determined living environment and the determined outdoor characteristics.

Clause 9: The method of clause 8, further comprising determining a level of glare sensitivity of the individual using an objective measurement, a subjective measurement, or a combination of the two, and selecting the at least one photochromic optical article based, at least in part, on the level of glare sensitivity of the individual.

Clause 10: The method of clauses 8 or 9, wherein the living environment of the individual includes at least one of the following: outdoor air temperature, exposure to radiation, or any combination thereof.

Clause 11: The method of clause 10, wherein the exposure to radiation comprises exposure to at least one of the following: UVA, UVB, blue light, visible light, infrared light, or any combination thereof.

Clause 12: The method of any of clauses 8 to 11, wherein the at least one selected optical article has a predicted photopic transmission in the living environment of the individual that falls within a comfort zone of the individual.

Clause 13: The method of any of clauses 8 to 12, wherein the at least one selected optical article has a predicted photopic transmission when activated by actinic radiation of 5-50% in the living environment of the individual.

Clause 14: The method of any of clauses 1 to 13, wherein the determining the environmental conditions for the area, the determining the first and second incident irradiances, the determining the first surface temperature of the at least one optical article and determining the first spectrum of the at least one optical article, and the determining the second surface temperature of the at least one optical article and determining the second spectrum of the at least one optical article are performed at a plurality of different global locations.

Clause 15: The method of any of clauses 1 to 14, wherein the determining of the environmental conditions for the area, the determining of the first and second incident irradiances, the determining of the first surface temperature of the at least one optical article and determining the first spectrum of the at least one optical article, and the determining of the second surface temperature of the at least one optical article and determining the second spectrum of the at least one optical article are performed at a plurality of different times in a day.

Clause 16: The method of any of clauses 5 to 15, wherein the outdoor air temperature comprises an average outdoor air temperature over 3-11 warmest or coldest months of a year.

Clause 17: The method of any of clauses 1 to 16, wherein the at least one optical article is positioned in at least one frame, and wherein the frame is positioned on the support.

Clause 18: The method of any of clauses 1 to 17, wherein the first surface temperature and the second surface temperature are determined using an infrared temperature gun.

Clause 19: The method of any of clauses 1 to 18, wherein the first direction is substantially opposite the second direction.

Clause 20: The method of any of clauses 8 to 19, wherein the at least one selected optical article has a predicted photopic transmission when activated by actinic radiation of 5-20% in the living environment of the individual.

Clause 21: The method of any of clauses 5 to 20, wherein the environmental conditions comprise the global irradiance and the directional irradiance, and wherein the global irradiance comprises global irradiance in a 360-430 nm range and the directional irradiance comprises directional irradiance in a 360-430 nm range.

Clause 22: The method of any of clauses 5 to 21, wherein the sky conditions comprise at least one of the following: sunny, cloudy, partly cloudy, rainy, snowy, foggy, dark, or any combination thereof.

Clause 23: The method of any of clauses 5 to 22, wherein the outdoor air temperature comprises an average outdoor air temperature throughout a year or a portion of the year.

Clause 24: A system for selecting a photochromic optical article comprising:

an environment module configured to determine living environment data of an individual;

a photochromic optical article characterization module configured to determine outdoor characteristics of a photochromic optical article; and a processor for computing the living environment data and outdoor characteristics data for providing a photochromic optical article recommendation.

Clause 25: The system of clause 24, further comprising a climate data determination module.

Clause 26: The system of clauses 24 or 25, further comprising a glare module for determining data representative of glare sensitivity of an individual.

Clause 27: A computer program product comprising at least one non-transitory computer-readable medium including at least one set of program instructions that, when executed by at least one computer including at least one processor, cause the at least one computer to carry out the steps of the method of any of clauses 1 to 23.

Clause 28: The computer program product of clause 27, wherein the computer is one of a smartphone, tablet computer, personal computer, personal digital assistant, portable computer, palmtop, mobile device, mobile telephone, server, wearable device, or any other type of computing device.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent ranges that are within the spirit and scope of the appended claims. For example, it is to be understood that the present invention contemplates, to the extent possible, one or more features of any embodiment can be combined with one or more features of any other embodiment.

The invention claimed is:

1. A method of determining outdoor characteristics of a photochromic optical article comprising:
    determining environmental conditions for an area;
    positioning at least one optical article on a support in the area such that the at least one optical article is facing a first direction;
    determining a first incident irradiance on the at least one optical article;
    determining a first surface temperature of the at least one optical article and determining a first spectrum of the at least one optical article;
    rotating at least one of the following: the at least one optical article, the support, or any combination thereof, such that the at least one optical article is facing a second direction different from the first direction;
    determining a second surface temperature of the at least one optical article and determining a second spectrum of the at least one optical article;
    determining a second incident irradiance on the at least one optical article; and
    generating a prediction model of spectral transmission of the at least one optical article based on at least one of the following: the first surface temperature, the first incident irradiance, the first spectrum, the second surface temperature, the second incident irradiance, the second spectrum, or any combination thereof.

2. The method of claim 1, wherein the at least one optical article comprises a first optical article and a second optical article, and wherein:
    the first surface temperature of the first optical article and the first incident irradiance on the first optical article are determined temporally proximally to the first surface temperature of the second optical article and the first incident irradiance on the second optical article; or
    the second surface temperature of the first optical article and the second incident irradiance on the first optical article are determined temporally proximally to the second surface temperature of the second optical article and the second incident irradiance on the second optical article; or
    the first spectrum of the first optical article is determined temporally proximally to the first spectrum of the second optical article; or
    the second spectrum of the first optical article is determined temporally proximally to the second spectrum of the second optical article,
    wherein the first optical article and the second optical article comprise the same or different photochromic effects.

3. The method of claim 1, wherein the determining of the environmental conditions for the area, the determining of the first and second incident irradiances, the determining of the first surface temperature of the at least one optical article and determining the first spectrum of the at least one optical article, and the determining of the second surface temperature of the at least one optical article and determining the second spectrum of the at least one optical article are performed between sunrise and sunset.

4. The method of claim 1, wherein the determining of the environmental conditions for the area, the determining of the first and second irradiances, the determining of the first surface temperature of the at least one optical article and determining the first spectrum of the at least one optical article, and the determining of the second surface temperature of the at least one optical article and determining the second spectrum of the at least one optical article are performed 30 minutes to three hours prior to or after solar noon.

5. The method of claim 1, wherein the environmental conditions comprise at least one of the following: outdoor air temperature, percent humidity, time of day, time of year, albedo, sky conditions, global irradiance, directional irradiance, or any combination thereof.

6. The method of claim 1, wherein the at least one optical article comprises at least one of the following: a lens, goggles, a visor, or a face shield.

7. The method of claim 1, wherein the first direction is a horizontal direction facing a present position of the sun, and the second direction is a horizontal direction facing away from the present position of the sun.

8. A method for selecting a photochromic optical article comprising:
    determining a living environment of an individual;
    determining outdoor characteristics of a plurality of different photochromic optical articles; and
    selecting at least one photochromic optical article from the plurality of different photochromic optical articles for the individual based, at least in part, on the determined living environment and the determined outdoor characteristics.

9. The method of claim 8, further comprising determining a level of glare sensitivity of the individual using an objective measurement, a subjective measurement, or a combination of the two, and selecting the at least one photochromic optical article based, at least in part, on the level of glare sensitivity of the individual.

10. The method of claim 8, wherein the living environment of the individual includes at least one of the following: outdoor air temperature, exposure to radiation, or any combination thereof.

11. The method of claim 10, wherein the exposure to radiation comprises exposure to at least one of the following: UVA, UVB, blue light, visible light, infrared light, or any combination thereof.

12. The method of claim 8, wherein the at least one selected optical article has a predicted photopic transmission in the living environment of the individual that falls within a comfort zone of the individual.

13. The method of claim 8, wherein the at least one selected optical article has a predicted photopic transmission when activated by actinic radiation of 5-50% in the living environment of the individual.

14. The method of claim 1, wherein the determining of the environmental conditions for the area, the determining of the first and second incident irradiances, the determining of the first surface temperature of the at least one optical article and determining the first spectrum of the at least one optical article, and the determining of the second surface temperature of the at least one optical article and determining the second spectrum of the at least one optical article are performed at a plurality of different global locations.

15. The method of claim 1, wherein the determining of the environmental conditions for the area, the determining of the first and second incident irradiances, the determining of the first surface temperature of the at least one optical article and determining the first spectrum of the at least one optical article, and the determining of the second surface temperature of the at least one optical article and determining the second spectrum of the at least one optical article are performed at a plurality of different times in a day.

16. A system for selecting a photochromic optical article comprising:
   an environment module configured to determine living environment data of an individual;
   a photochromic optical article characterization module configured to determine outdoor characteristics of a plurality of different photochromic optical articles; and
   a processor for computing the living environment data and outdoor characteristics data for providing a photochromic optical article recommendation comprising at least one photochromic optical article from the plurality of different photochromic optical articles.

17. The system of claim 16, further comprising a climate data determination module.

18. The system of claim 16, further comprising a glare module for determining data representative of glare sensitivity of an individual.

19. The system of claim 17, further comprising a glare module for determining data representative of glare sensitivity of an individual.

20. The method of claim 8, wherein the at least one optical article comprises at least one of the following: a lens, goggles, a visor, or a face shield.

* * * * *

UNITED STATES PATENT AND TRADEMARK OFFICE
CERTIFICATE OF CORRECTION

| | | |
|---|---|---|
| PATENT NO. | : 11,525,757 B2 | |
| APPLICATION NO. | : 16/462365 | |
| DATED | : December 13, 2022 | |
| INVENTOR(S) | : Gilles Baillet et al. | |

It is certified that error appears in the above-identified patent and that said Letters Patent is hereby corrected as shown below:

On the Title Page

Column 2, Abstract, Line 8, after "and" delete "Full Characterization of Lens"

Signed and Sealed this
Twenty-ninth Day of August, 2023

Katherine Kelly Vidal
*Director of the United States Patent and Trademark Office*